United States Patent [19]

Sandlin

[11] 3,851,843

[45] Dec. 3, 1974

[54] TRANSFER STATION ASSEMBLY

[75] Inventor: Charles Morris Sandlin, Newnan, Ga.

[73] Assignee: National Safe Corporation, Clearwater, Fla.

[22] Filed: Aug. 24, 1973

[21] Appl. No.: 391,222

[52] U.S. Cl. ................................................. 243/19
[51] Int. Cl. ............................................ B65g 51/32
[58] Field of Search ........... 243/1, 2, 19, 20, 21, 22, 243/23, 24, 25, 26, 27, 28, 16

[56] References Cited
UNITED STATES PATENTS
1,849,119  3/1932  Stoetzel ................................ 243/23
FOREIGN PATENTS OR APPLICATIONS
287,747  8/1915  Germany .............................. 243/20
1,021,293  12/1957  Germany .............................. 243/20

Primary Examiner—Allen N. Knowles
Assistant Examiner—Hadd Lane
Attorney, Agent, or Firm—Stein and Orman

[57] ABSTRACT

A transfer station assembly of the type used for receiving carriers utilized in a conveyor system or the like, wherein the assembly includes a tilting tray pivotally mounted in intercommunicating relation between a delivery and collector portion of the conveyor system whereby the tray includes at least two tray wall elements each of which are arranged in carrier interrupting positions such that when engaged by a carrier, the tray is rotated between one of two carrier receiving positions and one of two carrier delivery positions depending upon the particular wall element engaged by the carrier being transported in the conveyor system. Positioning of the tray is accomplished by a biasing means in the form of a weight connected directly to the tray means so as to normally bias it into a predetermined operative position relative to the remainder of the transfer station in which the assembly is mounted.

5 Claims, 11 Drawing Figures

3,851,843

PATENTED DEC 31 1974

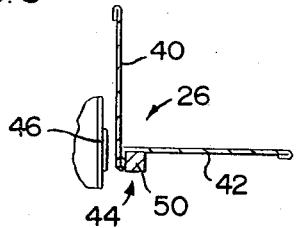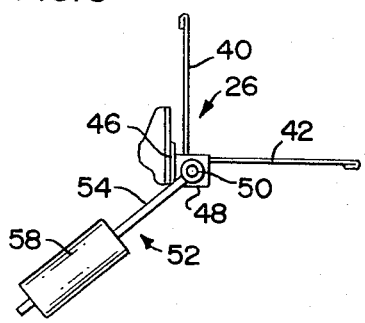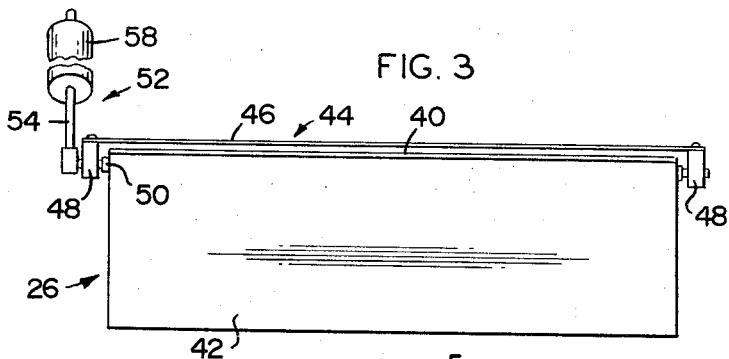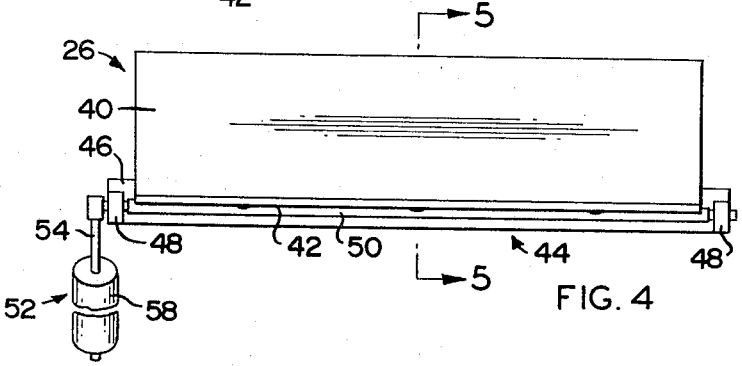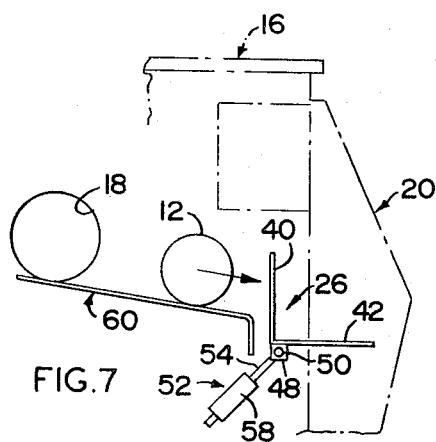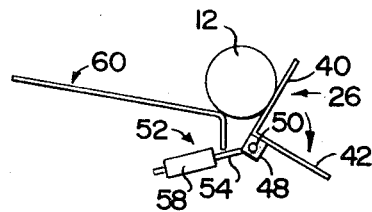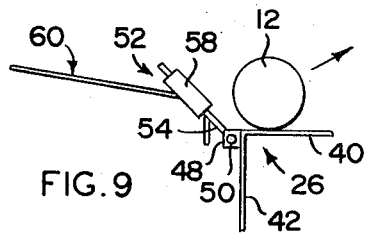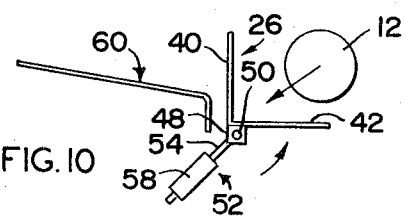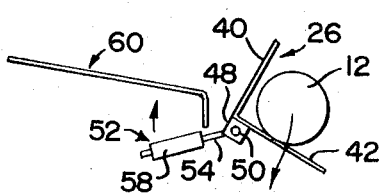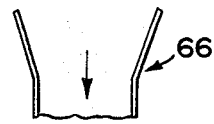

TRANSFER STATION ASSEMBLY

BACKGROUND OF THE INVENTION

1. Field of the Invention

This invention relates to a transfer assembly for carriers mounted at a transfer station which is normally remote from a central station or main portion of a conveyor system wherein the transfer assembly automatically delivers or receives a carrier arriving at or exiting from the transfer station.

2. Description of the Prior Art

Conveying systems which comprise one or more remote stations used to service various customers such as drive-in windows or the like in banking institutions have been well known for many years. Typically, such conveying systems are of the pneumatic type wherein a plurality of pneumatic tube lines interconnect a plurality of stations to a central station wherein a teller can service one or more "drive-in" customers by means of a carrier conveyed back and forth between the central station or control point and the respective transfer stations at which the customer is located. In such systems, the sender of various documents places them into a normally cylindrical carrier and inserts the carrier into one of the pneumatic tubes at what may be termed a central transfer station. The carrier is then transported, by pneumatic pressure, to the remote transfer station thereby transporting any predetermined document to this point. Upon arrival at the receiving transfer station, the carrier is delivered to a transfer assembly which serves to stop the carrier and make it accessible to the user located at the receiving transfer station. The customer located at the remote station removes any documents therein or in turn inserts documents of his own such as deposits, checks, etc., and returns the carrier to the central location for the desired service to be performed. Accordingly, the transfer assembly located at the remote station must be capable of efficiently receiving the carrier from the central transfer station while at the same time efficiently delivering the carrier to a collector portion of the conveying system so as to return the carrier, through an appropriate pneumatic line or tube to the central location.

Such a conveying system, in particular the transfer assembly involved in such a system, is primarily directed for the convenience and ease of use of the customer as well as efficient communication between two points, the transfer station assembly must be capable of readily delivering the carrier to the customer. This normally occurs by the customer merely reaching out his open window without the customer being required to leave his car thereby effecting the banking transaction with a minimum amount of trouble and discomfort to the user located at the remote transfer station. Accordingly, a commercially successful transfer assembly station must be constructed and designed such that carriers can be easily and conveniently removed therefrom as well as be inserted therein for effective transportation of the carrier to and from the remote transfer station. If the transfer station is not efficiently designed and therefore requires unnecessary customer discomfort in utilizing the assembly located at the transfer station it will obviously deter customer usage of the facility and impede commercial acceptance of the particular installation which is primarily installed for the convenience of an institution's customers.

Prior art devices of this nature suffer from inherent problems common to remote conveyor systems, in that these prior art systems do not present the desired degree of efficiency and ease of customer use and convenience. In addition, such a system must be reliable and capable of accurate transmission of the conveyor carrier between two desired points. Loss of documents or even delay in transmission of these documents through the carrier and conveyor system results in defeating the entire purpose of convenience and ease of use for which remote conveyor systems were primarily designed.

SUMMARY OF THE INVENTION

This invention relates to a transfer assembly mounted at a transfer station normally associated with conveyor systems designed primarily to transmit a carrier or like object between a central control station and one or more remotely located transfer stations.

More particularly, the transfer assembly mounted at any one of a number of transfer stations is capable of receiving a carrier, making it readily accessible to the user of the system located at the transfer station and delivering the carrier to a collector portion of the conveyor system for transmitting the carrier back to a remotely located central control transfer station.

More particularly, the transfer assembly includes a tray means movably or rotatably mounted in intercommunicating relation between a delivery portion and a collector portion of the conveyor system. It should be noted, however, that the conveyor system per se may be any type of conventional conveyor system including systems of the pneumatic type and the structural details of the conveyor system does not in and of itself form part of the present invention. Accordingly, reference to portions of the conveyor system such as the delivery and collector portions merely represents any conventional structure generally applicable to the present invention and is primarily designed for the delivery or transmission of one or more of the carriers utilized in the system.

The tray means includes a plurality of tray wall elements serving as activating means for rotating of the tray between receiving and delivery positions as will be explained more fully hereinafter. The tray walls are arranged in angular, substantially perpendicular relation to one another such that at least two of the walls are positioned in carrier engaging positions when a carrier is positioned either for being received by the tray means or being transmitted therefrom. A biasing means is connected directly to the tray means and comprises a weight element interconnected to the tray means by an elongated arm disposed so as to position the weight element in an extended, spaced apart relation to the tray. This weight means serves as a biasing means by virtue of it being disposed in substantially counterbalanced relation to the remainder of the tray. Accordingly, the tray means is biased to be maintained in what may be referred to as a first receiving position. Action of the weight element when the tray is rotated into another operative position other than the first receiving position serves to force the tray means back into the first receiving position after disengagement of either of the wall elements of the tray from the carrier.

In operation, the tray means of the present invention with the biasing means attached thereto is normally maintained in what may be referred to as the first receiving position. A carrier is delivered from the delivery portion of the conveyor system to the transfer station and into engagement with the activating means which is represented by a first wall element of the tray means when the tray is in its first receiving position. This causes rotation of the tray means into a first delivery position where access to the carrier may be had by the user or customer located at the remote transfer station. The carrier is removed from the transfer station and from the tray means and is either relieved of or filled with additional documents for return to the central transfer station. Upon removal of the carrier, the tray means automatically is returned to its initial operative position previously referred to as the first receiving position and which now may be referred to as the second receiving position due to the fact that the interior surface of the tray is exposed to the user of the remote transfer station. The carrier, when ready, is placed in contact with a second wall element of the tray which also defines the activating means of the tray. The weight of the carrier again forces rotation of the tray into what now may be referred to as a second delivery position whereby the carrier is transmitted to the collector portion of the conveyor system for transmission back to the central control transfer station. Again, the action of the biasing means on the tray forces it to be returned to its original operative position which may be referred to as a first receiving position with reference to carriers being delivered from the delivery portion of the conveyor system, or the second receiving position when being considered relative to carriers place on the second wall element by a user located at the transfer station.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanied drawing in which:

FIG. 3 is a top, partial cutaway view of the tray means in its original operative position.

FIG. 4 is a front plan view of the structure shown in FIG. 3.

FIG. 5 is a section view taken along line 5—5 of FIG. 4.

FIG. 6 is an end view of FIG. 4.

FIG. 7 is a schematic end view showing one or more carriers used in a conveyor system approaching the tray means of the present invention.

FIG. 8 is a schematic end view showing a carrier engaging and rotating the tray means.

FIGS. 9, 10 and 11 are schematic end views showing various stages of carrier delivery and transmission utilizing the tray means of the present invention.

Similar reference characters refer to similar parts throughout the views of the drawings.

DETAILED DESCRIPTION

Figure 1:
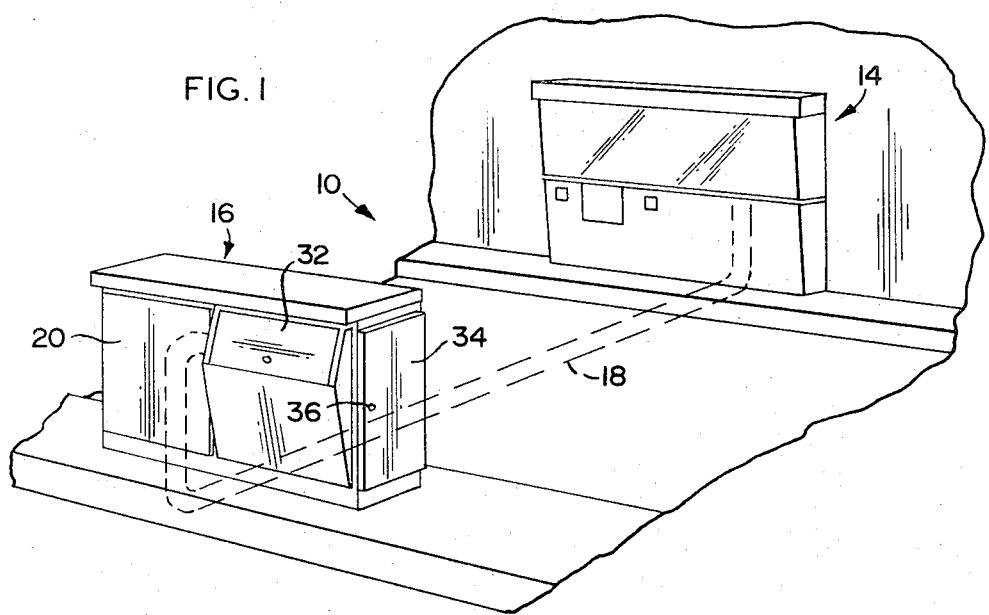
FIG. 1 is a partial cutaway elevational view of a central control transfer station and a remote transfer station interconnected to one another by a pneumatic tube or like conveyor portion.

As shown in FIG. 1, the present invention relates to a portion of a conveyor system indicated generally as 10 of the type used to transport carriers 12 between a central transfer station generally indicated at 14 and one or more remote transfer stations generally indicated as 16. The actual conveying system may be of the pneumatic type and accordingly may include one or more pneumatic tubes or lines 18 represented in broken lines and disposed in intercommunicating relation between the central transfer station 14 and the one or more remote transfer stations 16. It should be noted, however, that the conveyor system could be any applicable system utilized for the transporting of carrier-type objects between two remotely located stations.

Figure 2:
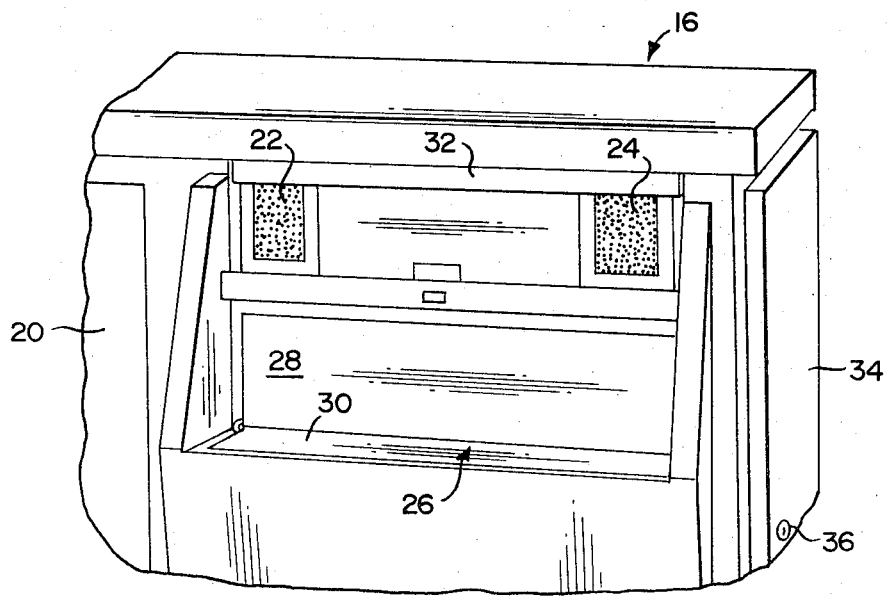
FIG. 2 is a partial cutaway, front elevational view of a transfer assembly station showing the tray means of the present invention installed therein.

FIG. 2 shows more specific detail of the remote transfer station 16 which includes housing 20 and any conventional communication system including microphone and speaker combinations 22 and 24 for vocal communication to a teller located at the central transfer station 14. The tray means is shown as being generally indicated as 26 and is more specifically described with reference to FIGS. 5 through 11 hereinafter. However, the tray means 26 is pivotally located in housing 20 of one or more remote transfer stations 16 such that the wall elements 40 and 42 of the tray means 26 allow the interior of the tray means to be exposed to the user of the remote station in a manner to render any carrier 12 readily accessible to the user even if he is located in an automobile or the like. A support platform 32 is in the form of a door which moves or slides into a compartment or space located above the access area to tray 26. The remaining portion of the housing 20 may serve as a receptacle and include an access means 34 including lock 36 for safely including any contents to be deposited or to render access to the interior of the housing for maintenance on the conveyor system itself. The specific details of the housing 20 of the remote station do not per se form any part of the present invention except those that are specifically set forth with reference to the correct and efficient operation of the tray means as hereinafter described.

Referring to FIGS. 3 through 6, the tray means 26 includes a plurality of tray wall elements including a first element 40 and a second wall element 42 fixedly connected in angular relation to one another and more specifically in substantially perpendicular relation to one another. The first and second wall elements are pivotally or rotatably connected to the remaining housing 20 of the transfer station 16 by a connecting means generally indicated as 44 and including a brace bar 46 and end blocks 48. This connecting means may be positioned adjacent to the juncture of wall elements 40 and 42 wherein the pivot block 50 serves essentially as a pivot point around which the tray element rotates as is demonstrated in FIGS. 7 through 11 to be described hereinafter.

A biasing means generally indicated as 52 includes an elongated arm 54 interconnected between the tray means 26, at connecting means 44 and a weight element 58 connected to the opposite end thereof. The weight element 58 is connected thereto in substantially spaced extended relation from the tray means so as to act substantially as a counterbalance weight for biasing the tray means in the position shown in FIGS. 5, 6 and 7 which may be referred to as the first positioning means.

A tray activating means is defined by the first and second wall elements 40 and 42 respectively. These wall elements comprise a first activating surface 39 and a second activating surface 41, respectively, as indicated in FIGS. 7 through 11. The first and second activating surfaces are normally biased in carrier engaging position relative to the delivery portion 60 and the collector portion 66 of the conveyor system as shown in FIGS. 7 and 10. dependent With specific reference to FIGS. 7 through 11, the delivery portion of the conveyor system is generally indicated as 60 and represents that portion of the conveyor system wherein carriers 12 come from the pneumatic tube or other conveyor elements which comprise the conveyor system.

Discussing the FIGS. 7 through 11 in sequence, the operation of the tray means comprising the main portion of the transfer assembly, is activated by engagement of carrier 12 with the activating surface 39 of the first wall element 40. Due to the weight of the carrier and the force exerted by the carrier on wall elements 40 due to the incline of delivery portion 60, the tray means 26 is forced to rotate in a clockwise direction from a first receiving position defined by the position of tray means in FIG. 7 to a first delivery position defined by the position of the tray means in FIG. 9.

Once in the first delivery position, the carrier 12 is readily accessible to any user of the transfer station, for instance, if he is located in an automobile immediately adjacent to the housing 20 of transfer station 16. Upon removal of carrier 12 by the user of the system, the tray 26 immediately rotates counterclockwise back into the position shown in FIG. 10. This is the same position as shown in FIG. 7, but as represented in FIG. 10, may be termed the second receiving position since the carrier 12 is designed to be then replaced, after use by the customer located at the transfer station, back onto the tray means 26. More precisely, the carrier 12 is placed on wall element 42 which also comprises the activating means and the weight of the carrier forces rotation of the tray means again in a clockwise direction until it reaches a second delivery position partially represented in FIG. 11. In this position the carrier 12 is allowed to pass or fall by gravity into the collector portion of the conveyor system generally indicated as 66. From this point the carrier passes back into the main portion of the conveyor system, for instance, when it passes through a pneumatic tube or like conveyor 18 arranged in intercommunicating relation between the central transfer station 14 and the remote transfer station 16.

It should be noted that the delivery position clearly defined in FIG. 9, by virtue of the carrier 12 engaging activating surface 39; and the collector position at least partially indicated in FIG. 11 by virtue of carrier 12 engaging activating surface 41; are defined essentially by the same orientation of wall elements 40 and 42 and these positions are distinguished only by engagement of carrier 12 with either surface 39 (delivery position) or 42 (collector position).

It will thus be seen that the objects made apparent from the preceding description, are efficiently attained and, since certain changes may be made in the above construction without departing from the scope of the invention, it is intended that all matter contained in the above description or shown in the accompanying drawing, shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Now that the invention has been described, What is claimed is:

1. A transfer station assembly for a carrier used in combination with a delivery portion and a collector portion of a conveyor system, said assembly comprising: tray means movably mounted in interconnected relation between said delivery portion and said collector portion, biasing means connected to said tray means and disposed relative thereto so as to movably bias said tray means in predetermined relation to said delivery portion and said collector portion, tray activating means including a first wall element and a second wall element rigidly connected to one another and movably disposable in carrier engageable position relative to said delivery portion and said collector portion, said first wall element comprising a first activating surface, said second wall element comprising a second activating surface; said first and second activating surfaces normally disposed in direct communication with and in carrier engageable relation to said delivery portion and said collector portions, respectively, by virtue of the relative disposition of said first and second wall elements and said biasing means.

2. A transfer station assembly as in claim 1 wherein said biasing means comprises weight means connected to said tray means in outwardly extended spaced relation thereto.

3. A transfer station assembly as in claim 2 wherein said weighted means further comprises arm means and a weight element, said arm means interconnected between said weight element and said tray means, whereby said weight element is disposed to act as a counterbalanced weight means relative to said tray.

4. A transfer station assembly as in claim 1 wherein said first and second wall elements are arranged in angular relation to one another, tray connecting means pivotally connecting said first and second tray elements so as to move between said delivery portion and said collector portion of said conveyor system, said first and second activating surfaces movably biased in carrier engaging disposition relative to said delivery and collector portions, respectively, whereby engagement of the carrier with either said first or second activating surfaces causes rotation of said tray means into a delivery position or in collector position, respectively.

5. A transfer station assembly as in claim 4 wherein said delivery position and said collector position are defined by the same orientation of said first and second wall elements; said delivery position and said collector position of said tray means distinguishable by the disposition of the carrier relative to said first and second wall elements upon engagement between the carrier and said tray means.

* * * * *

UNITED STATES PATENT OFFICE
CERTIFICATE OF CORRECTION

Patent No. 3,851,843　　　　　　　　　Dated December 3, 1974

Inventor(s) Charles Morris Sandlin

It is certified that error appears in the above-identified patent and that said Letters Patent are hereby corrected as shown below:

Column 5, line 12, delete "dependent".

Signed and sealed this 18th day of March 1975.

(SEAL)
Attest:

RUTH C. MASON
Attesting Officer

C. MARSHALL DANN
Commissioner of Patents
and Trademarks